(12) United States Patent
Leung

(10) Patent No.: US 6,286,415 B1
(45) Date of Patent: Sep. 11, 2001

(54) COFFEE MAKER

(75) Inventor: Chi Wah Leung, Chaiwan (HK)

(73) Assignee: Simatelex Manufactory Co., Ltd., Hong Kong (HK)

(*) Notice: Subject to any disclaimer, the term of this patent is extended or adjusted under 35 U.S.C. 154(b) by 0 days.

(21) Appl. No.: 09/603,324

(22) Filed: Jun. 26, 2000

(51) Int. Cl.[7] ............................................. A47J 31/00
(52) U.S. Cl. ............................ 99/288; 99/279; 99/290; 99/323.3; 220/592.28
(58) Field of Search .......................... 99/288, 290, 299, 99/304, 306, 323.3, 279, 473, 476; 220/592.28, 592.22, 592.2; 165/104.34, 122, 121, 120, 918, 132

(56) References Cited

U.S. PATENT DOCUMENTS

| | | | |
|---|---|---|---|
| 1,569,788 | * 1/1926 | Sanborn | 220/592.28 X |
| 3,355,045 | * 11/1967 | Douglas | 220/592.22 X |
| 5,168,793 | * 12/1992 | Padamsee | 99/279 |
| 5,564,331 | * 10/1996 | Song | 99/476 X |

\* cited by examiner

*Primary Examiner*—Reginald L. Alexander
(74) *Attorney, Agent, or Firm*—Jackson Walker L.L

(57) ABSTRACT

An otherwise conventional automatic-chip coffee maker has a glass carafe made with an inner layer and an outer layer separated by an air gap. Openable apertures allow hot air to enter the air gap when the carafe is supported on a base. The hot air is supplied from a heating coil by a fan and flows into the air gap. During preparation of coffee the hot air can be used to initially heat up the carafe, to brew coffee in the carafe and to keep the coffee warm.

5 Claims, 3 Drawing Sheets

COFFEE MAKER

BACKGROUND OF THE INVENTION

1. Field of the Invention

The invention relates to coffee makers.

The invention relates in particular to automatic-drip coffee makers.

2. Description of Prior Art

In conventional electric automatic-drip coffee makers, water is poured into a reservoir and is heated. Hot water is pumped on to coffee grounds in a filter basket to drip into an open topped carafe. The coffee makers normally brew coffee at 190° F. to 200° F. and keep the coffee at that temperature by means of a hot plate beneath the carafe. Dials or sensors may be provided to let the user adjust the temperature of the coffee in the carafe. It is believed that coffee aroma and flavor will deteriorate if the carafe sits on the warm plate for some time due to continuous reheating at the bottom of the carafe and contact with air at the top of the carafe. The main benefit of using a conventional coffee maker construction with a glass carafe and a warm plate is its low cost advantage as a single heater can be employed. However, this kind of construction will usually have the problem of a too low a brewing temperature, significant heat loss through the surface of the glass carafe, continuous reheating the coffee at adjacent the bottom of the carafe, contact with cold air at the top and also an unstable warm plate temperature due to power cycling of the heater underneath.

One design solution has been proposed which employs a dual heater system, a high power vertical heater for water heating and a lower power heater underneath the warm plate. This aims to maintain a more stable warm plate temperature.

In some coffee makers, the coffee brews in a thermal carafe, using either a glass vacuum flask or stainless steel vacuum flask. A tightly fitted lid is usually present to prevent cooler air from entering the carafe. The coffee is therefore never exposed to the air and the carafe does not sit on a hot plate. Using the thermal carafe can improve some of the drawbacks of the conventional construction, because higher coffee temperature can be obtained by using a vertical heater construction. There is no need for reheating of the coffee so that a better flavor can be maintained, and there is no contact with cold air due to using an air-tight lid. But disadvantages include a lack of visibility of the coffee remaining inside the carafe, and a more bulky size for the same capacity. Also, the coffee does not stay hot continuously inside the thermal carafe, and there can be no coffee temperature adjustment inside the thermal carafe by applying external heat from a hot plate, for example. The relative cost of the thermal carafe itself is significantly higher.

SUMMARY OF THE INVENTION

It is an object of the invention to overcome or at least reduce these problems.

According to the invention there is provided an electrical automatic-drip coffee maker including a carafe for receiving the coffee, in which the carafe is formed of two layers of material, an air gap between the two layers and surrounding the inner layer. Apertures in the outer layer allow air to flow into the air gap from outside the carafe. An electrically operated hot air source with an outlet is arranged to supply air through the apertures to circulate in the air gap.

The hot air source means may comprise an electrical heating element and an electrically operated fan.

A manually adjustable controller may be provided to enable the hot air source means to be adjusted to vary the temperature of the carafe.

The carafe is preferably formed of transparent material.

An automatic closure means may be provided for the apertures arranged to be automatically close off the apertures whenever the carafe is lifted off a base of the coffee maker.

BRIEF DESCRIPTION OF THE DRAWINGS

An electric automatic-drip coffee maker according to the invention will now be described by way of example with reference to the accompanying drawings in which.

DESCRIPTION OF THE PREFERRED EMBODIMENT

Figure 1:
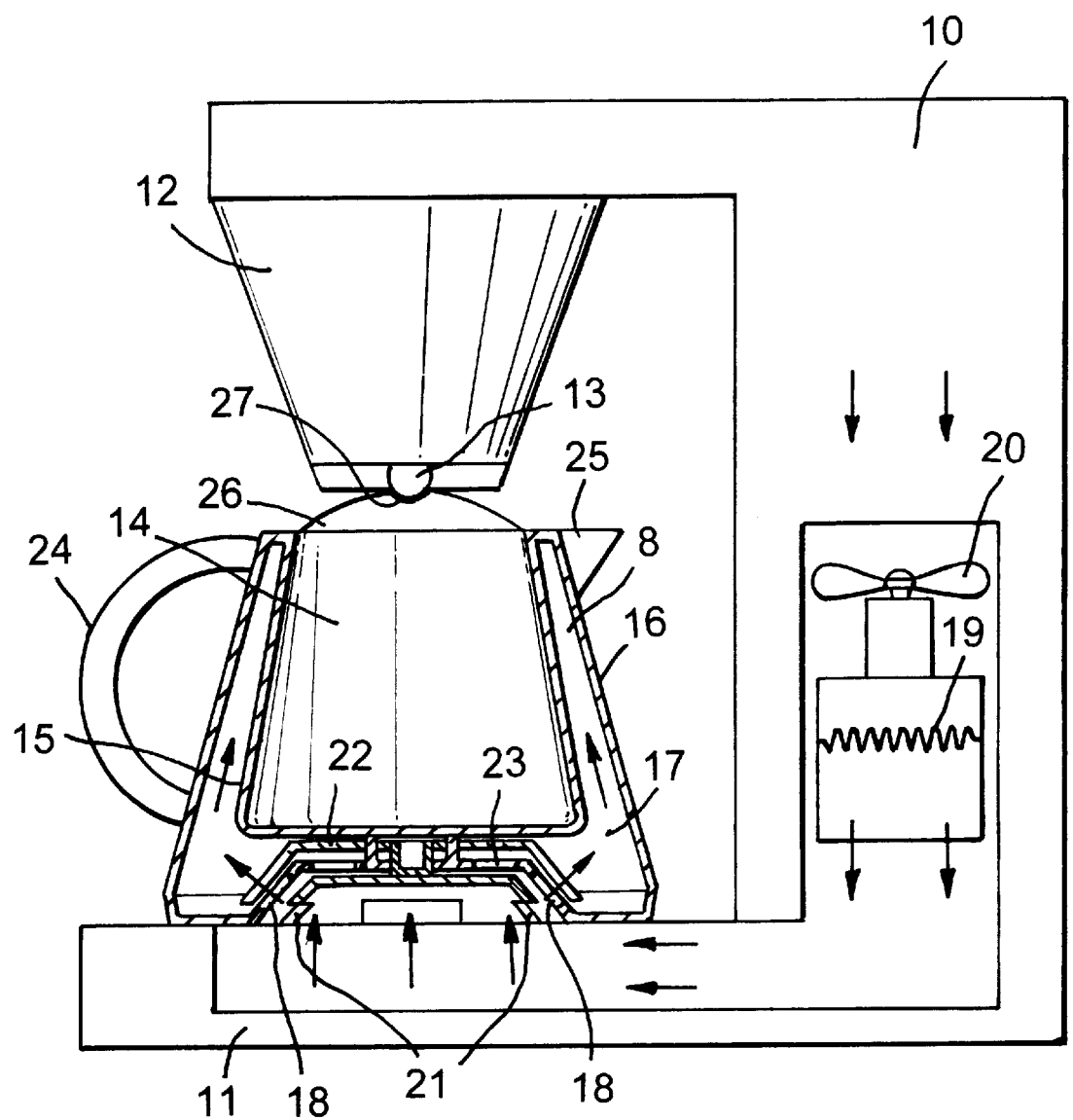
FIG. 1 is a diagrammatic side view of the coffee maker.

Referring to the drawings, in FIG. 1 the coffee maker has a stand 10 with a base 11 and a hopper 12 with a bottom coffee outlet 13. Inside the stand 10, there is provided in conventional manner, but not shown, well-known components including a water reservoir, an electrical water heating elements and a coffee basket. Coffee is made by heating the water which is automatically forced up to pour into the coffee basket and run through the basket to drip out of the outlet 13.

In embodiments of the invention, a carafe 14 is provided which is formed of an inner and outer layer of glass 15 and 16. The layers are separated by an air gap 17 that extends and surrounds the inner layer 15. Apertures 18, or perforations, are provided in the outer layer 16 to allow hot air to enter the air gap 17, as shown by arrows in the Figure. An electric heating element 19 and an electrically operated fan 20 are supported inside the stand 10 for supplying the hot air to outlets 21 mounted in the base 11. The outlets 21 are positioned closely adjacent and opposite the apertures 18 when the carafe is placed upon and supported on the base 11 as shown in the Figure. A centrally located loose cap 22 inside the air gap 17 is held up by a stub axle 23 away from the apertures 18 when the carafe sits on the base as shown in the Figure. When the carafe is removed the cap drops down under gravity (or under the bias of a spring, not shown) to close off the apertures 18. This prevents cold air entering the air gap 17.

In use, hot air can be supplied to the carafe, when required, to pre-heat to the carafe, to maintain a brewing temperature of coffee in the carafe, and to keep the coffee warm in the carafe after brewing is completed.

The carafe has a handle 24 and a spout 25 and the carafe is removable from the stand 10, from time to time as required, for pouring coffee from the carafe and for cleaning, storing and so forth. A sealable lid 26 fits to the top of the carafe. A valve 27 may be fitted to the hopper 12 that automatically closes off when the carafe is removed from the stand. Such automatic valves are known per se.

The double layered carafe described is not normally significantly more expensive than any single layered glass carafe normally used in the prior art. In embodiments of the invention, no heating element is required in the base 11 to brew the coffee or to keep the coffee warm. It will also be appreciated that as the hot air will circulate generally completely around the air gap in use, heating for brewing and keeping warm will be much more even that when a bottom hot plate heater is used. The temperatures for brewing, and keeping warm, are readily controllable and adjustable, because such controls and adjustments simply require a power supply to the heating element and/or fan to be changed, or turned ON and OFF from time to time, for example. It is also a simple matter to heat up the carafe evenly and initially, before the coffee is first dripped into the carafe, using the described hot air supply. This is not possible in the prior art arrangements.

In the described embodiment, the carafe is made of glass. Other suitable materials can be used for either or both the inner and outer layers 15 and 16. Preferably such materials are transparent or partially transparent so that the level of coffee in the carafe is visible from outside the carafe. This is often a problem or disadvantage inherently suffered by the prior art arrangements where conventional thermal carafes are used.

Figure 2:
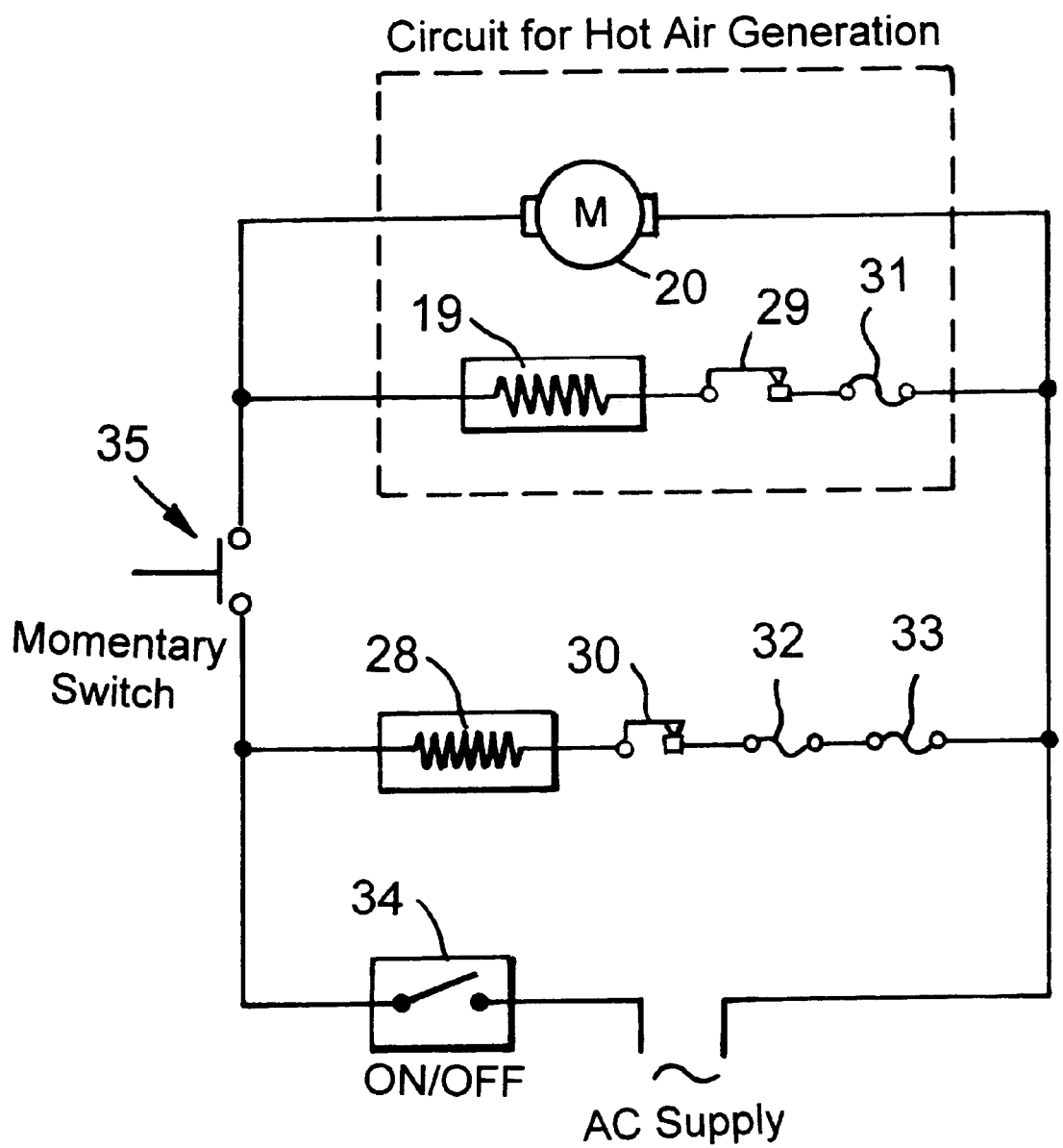
FIG. 2 is a schematic circuit diagram of one circuit for the coffee maker.

In FIG. 2, the circuit includes a water heating element 28 for heating water in a reservoir in conventional fashion to drive the water into a coffee filter basket (not shown). The heating elements 28 and 19 are each provided, in series, with thermostats 29 and 30 and fuses 31, and 32 and 33, respectively. An ON-OFF switch 34 and a "momentary" switch 35 (a one "press-switch") are provided to control or initiate supply of power to the heating elements 19 and 28.

Figure 3:
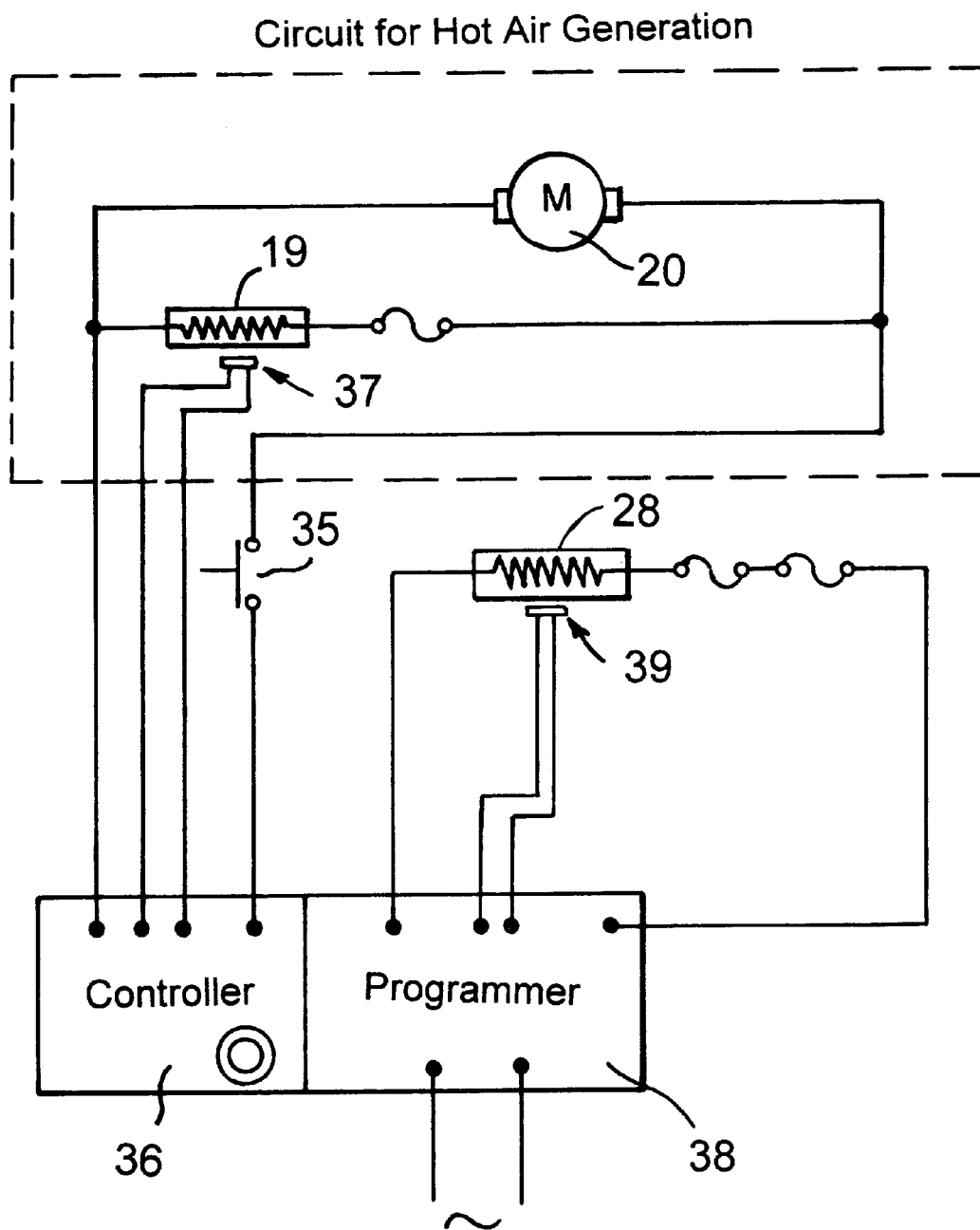
FIG. 3 is a schematic circuit diagram of another circuit for the coffee maker.

In FIG. 3, the circuit is generally the same as in FIG. 2, except the heating element 19 and/or fan 20 is operated by a manually adjustable controller 36 which can respond to a temperature sensor 37, and the heating element 28 is operated by a pre-programmable programmer 38 that can respond to a temperature sensor 39.

I claim:

1. An electrical automatic-drip coffee maker comprising:

a carafe for receiving coffee wherein the carafe further comprises an inner layer of material and an outer layer of material, an air gap between the inner and outer layers and surrounding the inner layer and, apertures in the outer layer to allow air to flow into the air gap from outside the carafe; and an electrically operated hot air source with an outlet connected to supply air through the apertures to circulate in the air gap.

2. An electric automatic-drip coffee maker according to claim 1, in which the hot air source means comprises an electrical heating element and an electrically operated fan.

3. An electric automatic-drip coffee maker according to claim 2, including a manually adjustable controller to enable the hot air source means to be adjusted to vary the temperature of the carafe.

4. An electric automatic-drip coffee maker according to claim 1, in which the carafe is formed of transparent material.

5. An electric automatic-drip coffee maker according to claim 1, including automatic closure means for the apertures arranged to be automatically close off the apertures whenever the carafe is lifted off a base of the coffee maker.

\* \* \* \* \*